(12) United States Patent
Boger et al.

(10) Patent No.: US 8,591,820 B2
(45) Date of Patent: Nov. 26, 2013

(54) HONEYCOMB FILTERS FOR REDUCING $NO_x$ AND PARTICULATE MATTER IN DIESEL ENGINE EXHAUST

(75) Inventors: Thorsten Rolf Boger, Painted Post, NY (US); Suhao He, Painted Post, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 300 days.

(21) Appl. No.: 13/046,275

(22) Filed: Mar. 11, 2011

(65) Prior Publication Data

US 2012/0230881 A1  Sep. 13, 2012

(51) Int. Cl.
*B01D 50/00* (2006.01)
*B28B 1/00* (2006.01)

(52) U.S. Cl.
USPC .......................... 422/180; 264/628; 264/630

(58) Field of Classification Search
USPC ..................................... 422/179, 180; 55/523
See application file for complete search history.

(56) References Cited

U.S. PATENT DOCUMENTS

| | | | |
|---|---|---|---|
| 4,857,089 A * | 8/1989 | Kitagawa et al. | 55/523 |
| 5,519,993 A * | 5/1996 | Rao et al. | 60/288 |
| 6,753,294 B1 | 6/2004 | Brisley et al. | 502/439 |
| 7,264,785 B2 | 9/2007 | Blakeman et al. | 423/213.2 |
| 7,674,743 B2 | 3/2010 | Gandhi et al. | 502/302 |
| 7,772,151 B2 | 8/2010 | Li et al. | 502/339 |
| 7,811,962 B2 | 10/2010 | Hu et al. | 502/304 |
| 2005/0282698 A1 | 12/2005 | Southward et al. | 502/34 |
| 2007/0028604 A1* | 2/2007 | Twigg et al. | 60/297 |
| 2007/0059223 A1 | 3/2007 | Golunski et al. | 422/180 |
| 2008/0044319 A1* | 2/2008 | Takahashi et al. | 422/180 |
| 2008/0127638 A1 | 6/2008 | Vaarkamp et al. | 60/297 |
| 2008/0141661 A1 | 6/2008 | Voss et al. | 60/295 |
| 2009/0004079 A1 | 1/2009 | Hancu et al. | 423/213.5 |
| 2009/0104096 A1 | 4/2009 | Patchett et al. | 423/213.5 |

(Continued)

FOREIGN PATENT DOCUMENTS

| | | | |
|---|---|---|---|
| EP | 1 820 946 | 8/2007 | F01N 3/022 |
| EP | 1 974 798 | 10/2008 | B01D 53/94 |

(Continued)

OTHER PUBLICATIONS

European Search Report for European Application No. 12158706.7; mailing date Jun. 22, 2012—4 pages.
Todd Ballinger, Julian Cox, Mahesh Konduru, Debnath DE, Wendy Manning and Paul Anderson, "Evaluation of SCR Catalyst Technology on Diesel Particulate Filters", SAE International, 2009-01-0910, vol. 2, Issue 1.

(Continued)

*Primary Examiner* — Tom Duong
(74) *Attorney, Agent, or Firm* — Matthew B. McNutt (57) ABSTRACT

Particulate filters for reducing $NO_x$ and particulate matter in diesel exhaust and methods for forming the same are disclosed. In one embodiment, a particulate filter may include a honeycomb body with a plurality of channel walls extending from an inlet end to an outlet end. At least a first set of the channels are plugged proximate at least one of the inlet end or the outlet end. A filter zone may extend from the inlet end in an axial direction of the particulate filter. A $DeNO_x$ zone may be located downstream of the filter zone. The channel walls of the particulate filter may include a $DeNO_x$ functional catalyst in the $DeNO_x$ zone and a ratio of the permeability $\kappa_{fz}$ of the channel walls in the filter zone to the permeability $\kappa_{Dz}$ of the channel walls in the $DeNO_x$ zone ($\kappa_{fz}$:$\kappa_{Dz}$) is at least 2.

18 Claims, 7 Drawing Sheets

(56) References Cited

U.S. PATENT DOCUMENTS

| | | | |
|---|---|---|---|
| 2009/0137386 A1 | 5/2009 | Pfeifer et al. | 502/262 |
| 2009/0173063 A1* | 7/2009 | Boorse et al. | 60/299 |
| 2009/0197764 A1 | 8/2009 | Yamato et al. | 502/339 |
| 2009/0320457 A1 | 12/2009 | Wan | 60/299 |
| 2010/0062930 A1 | 3/2010 | Sato et al. | 502/339 |
| 2010/0098612 A1 | 4/2010 | Lee et al. | 423/239.1 |
| 2010/0150790 A1 | 6/2010 | Zuberi | 422/171 |
| 2010/0180561 A1 | 7/2010 | Beall et al. | 55/476 |
| 2010/0247396 A1 | 9/2010 | Zuberi | 422/170 |
| 2010/0257843 A1 | 10/2010 | Hoke et al. | 60/274 |
| 2010/0269491 A1 | 10/2010 | Boorse et al. | 60/295 |

FOREIGN PATENT DOCUMENTS

| | | | |
|---|---|---|---|
| EP | 2 058 042 | 5/2009 | B01D 39/20 |
| EP | 2 070 579 | 6/2009 | B01D 53/86 |
| WO | WO 2009148498 A1 * | 12/2009 | |

OTHER PUBLICATIONS

Giovanni Cavataio, James W. Girard and Christine K. Lambert, "Cu/Zeolite SCR on High Porosity Filters: Laboratory and Engine Performance Evaluations", SAE International, 2009-01-0897.

Yongshen HE, David B. Brown, Shuguang Lu, Michael J. Paratore and Jianwen Li (General Motors Corporation), Opportunites and Challenges for Blended 2-Way SCR/DPF Aftertreatment Technologies, SAE International, 2009-01-0274.

Daniel Chatterjee, Thomas Burkhardt and Michel Weibel (DaimlerChrysler AG), and Isabella Nova, Antonio Grossale and Enrico Tronconi, "Numerical Simulation of Zeolite- and V-Based SCR Catalytic Converters", SAE International, 2007-01-1136, Warrendale, PA 15096-0001 U.S.A.

Michael Schaefer and Lothar Hofmann and Patrick Girot and Renaud Rohe, "Investigation of NOx- and PM-reduction by a Combination of SCR-catalyst and Diesel Particulate Filter for Heavy-duty Diesel Engine", SAE International, 2009-01-0912, vol. 2, Issue 1.

* cited by examiner

HONEYCOMB FILTERS FOR REDUCING NO$_x$ AND PARTICULATE MATTER IN DIESEL ENGINE EXHAUST

BACKGROUND

1. Field

The present specification generally relates to filters for diesel engine exhaust and, more specifically, to ceramic honeycomb filters for reducing NO$_x$ and particulate matter in the exhaust streams of diesel engines and methods for making the same.

2. Technical Background

With the implementation of the EPA 2007 regulations governing diesel exhaust emission in the U.S. the use of diesel particulate filters has been a necessary component of diesel engine exhaust after-treatment systems. The introduction of the EPA 2010 regulations governing diesel exhaust emissions have further regulated nitrous oxide (NO$_x$) emission limits thereby creating a need for alternative solutions for both the reduction of particulate matter and NO$_x$ compounds in diesel exhaust.

Another trend of exhaust gas treatment systems is the reduction of the total system volume. Attempts have been made to integrate DeNO$_x$ functional catalyst materials into a diesel particulate filter thereby eliminating the need for separate devices. However, there exists a competition for NO$_2$ in the exhaust gas stream between the DeNO$_x$ reaction and the soot passive regeneration reaction required to reduce soot loads in the filter. This competition significantly reduces passive regeneration performance of the particulate filter.

Accordingly, a need exists for alternative particulate filters with DeNO$_x$ functionality and improved passive regeneration performance.

SUMMARY

According to one embodiment, a particulate filter may include a honeycomb body comprising an inlet end and an outlet end with a plurality of channel walls extending from the inlet end to the outlet end. The plurality of channel walls generally define channels that direct a flow of fluid from the inlet end to the outlet end. At least a first set of the channels may be plugged proximate at least one of the inlet end or the outlet end. A filter zone extends from the inlet end of the honeycomb body in an axial direction of the honeycomb body. An axial length $l_{fz}$ of the filter zone is generally less than an axial length L of the honeycomb body. A DeNO$_x$ zone is positioned downstream of the filter zone and extends in an axial direction towards the outlet end of the honeycomb body. The channel walls of the honeycomb body may include a DeNO$_x$ functional catalyst in the DeNO$_x$ zone and a ratio of the permeability $\kappa_{fz}$ of the channel walls in the filter zone to the permeability $\kappa_{Dz}$ of the channel walls in the DeNO$_x$ zone ($\kappa_{fz}:\kappa_{Dz}$) is at least 2.

In another embodiment, a particulate filter may includes a honeycomb body comprising an inlet end and an outlet end with a plurality of channel walls extending from the inlet end to the outlet end. The plurality of channel walls generally define channels that direct a flow of fluid from the inlet end to the outlet end. Individual ones of the channels may be plugged proximate at least one of the inlet end or the outlet end. A filter zone may extend from the inlet end of the honeycomb body in an axial direction of the honeycomb body. The filter zone filters particulate matter from the flow of fluid and the channel walls of the channels are bare in the filter zone. An axial length $l_{fz}$ of the filter zone is less than an axial length L of the honeycomb body. A DeNO$_x$ zone may extend from an end of the filter zone to the outlet end of the honeycomb body in an axial direction of the honeycomb body. The channel walls of the honeycomb body may include an SCR coating in the DeNO$_x$ zone for reducing NO$_x$ in the flow of fluid through the filter. A ratio of the permeability $\kappa_{fz}$ of the channel walls in the filter zone to the permeability $\kappa_{Dz}$ of the channel walls in the DeNO$_x$ zone ($\kappa_{fz}:\kappa_{Dz}$) may be at least 2.

In another embodiment, a method of forming a particulate filter may include mixing a batch of ceramic precursor materials and extruding the batch of ceramic precursor materials to form a green honeycomb body comprising an inlet end and an outlet end with a plurality of channel walls extending from the inlet end to the outlet end. The green honeycomb body may be fired to form a fired honeycomb body. Thereafter, a portion of the fired honeycomb body may be loaded with a DeNO$_x$ functional catalyst composition such that, after loading, the fired honeycomb body has a filter zone and a DeNO$_x$ zone comprising the DeNO$_x$ functional catalyst downstream of the filter zone. A ratio of the permeability $\kappa_{fz}$ of the channel walls in the filter zone to the permeability $\kappa_{Dz}$ of the channel walls in the DeNO$_x$ zone ($\kappa_{fz}:\kappa_{Dz}$) may be least 2.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
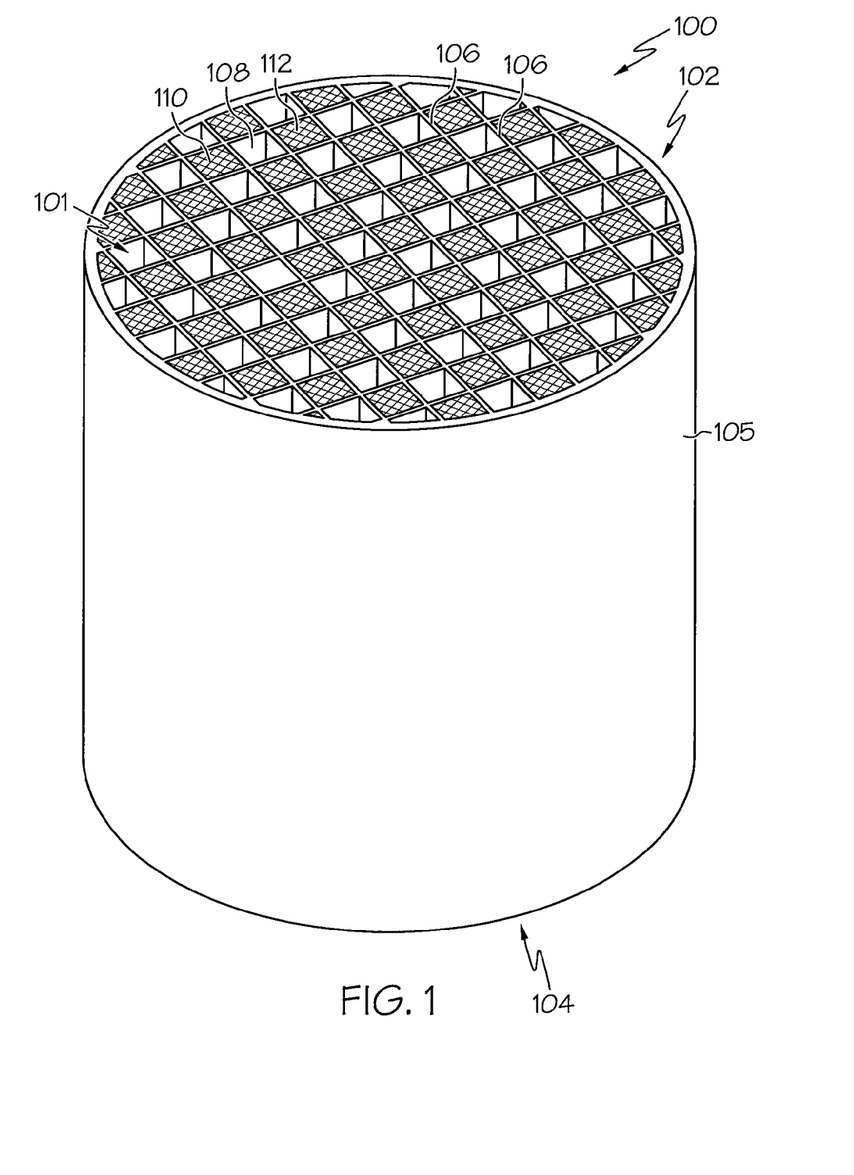
FIG. 1 schematically depicts a particulate filter according to one or more embodiments shown and described herein.

Referring now to FIG. 1, a particulate filter is schematically depicted according to one or more embodiments shown and described herein. The particulate filter is generally a honeycomb structure comprising a plurality of parallel channels defined by intersecting channel walls. The channels are divided along the axial length of the particulate filter into a filter zone and a DeNO$_x$ zone located downstream of the filter zone. The DeNO$_x$ zone generally comprises a DeNO$_x$ functional catalyst for catalytically reducing NO$_x$ compounds in an exhaust gas stream. The permeability of the channel walls in the DeNO$_x$ zone is generally lower than the permeability of the channel walls in the filter zone such that a ratio of the permeability $\kappa_{fz}$ of the channel walls in the filter zone to the permeability $\kappa_{Dz}$ of the channel walls in the DeNO$_x$ zone ($\kappa_{fz}$:$\kappa_{Dz}$) is at least 2. The particulate filter and methods of making the particulate filter will be described in more detail herein.

The terms "upstream" and "downstream" will be used herein to describe the relative orientation of zones of the particulate filter. The term "upstream," as used herein, refers to a zone which is closer in proximity to the inlet end of the particulate filter than the zone to which it is being compared. Similarly, the term "downstream," as used herein, refers to a zone which is in closer proximity to the outlet end of the particulate filter than the zone to which it is being compared.

The term "permeability" refers to the ability of a fluid to penetrate and flow through the channel walls of the particulate filter. In the embodiments and examples described herein, the permeability of the channel walls can be calculated according to the equation:

$$u = \frac{\kappa}{\mu} \frac{\Delta p}{\delta},$$

where u is the velocity of the fluid through the channel wall in m/s, $\kappa$ is the permeability of the channel wall in m$^2$, $\mu$ is the viscosity of the fluid, $\Delta p$ is the pressure drop across the channel walls in Pascals, and $\delta$ is the thickness of the channel wall. Given a particulate filter with a known channel wall thickness and a fluid of a known viscosity, the permeability of the wall can be back calculated after measuring the rate of fluid flow through the channel walls and the pressure drop across the channel walls. Alternatively a porometer can be utilized to determine the permeability of different zones of the particulate filter.

Referring now to FIG. 1, a particulate filter 100 is schematically depicted. The particulate filter 100 may be used as a wall-flow filter to filter particulate matter from an exhaust gas stream, such as an exhaust gas stream emitted from a diesel engine. The particulate filter may also be used to reduce the content of nitrous oxide compounds (NO$_x$) in the exhaust gas stream. The particulate filter 100 generally comprises a honeycomb body having a plurality of channels 101 or cells which extend between an inlet end 102 and an outlet end 104. The channels 101 of the particulate filter 100 are formed by, and at least partially defined by a plurality of intersecting channel walls 106 that extend from the inlet end 102 to the outlet end 104. The particulate filter 100 may also include a skin layer 105 surrounding the plurality of channels 101. This skin layer 105 may be extruded during the formation of the channel walls 106 or formed in later processing as an after-applied skin layer, such as by applying a skinning cement to the outer peripheral portion of the channels.

Figure 2:
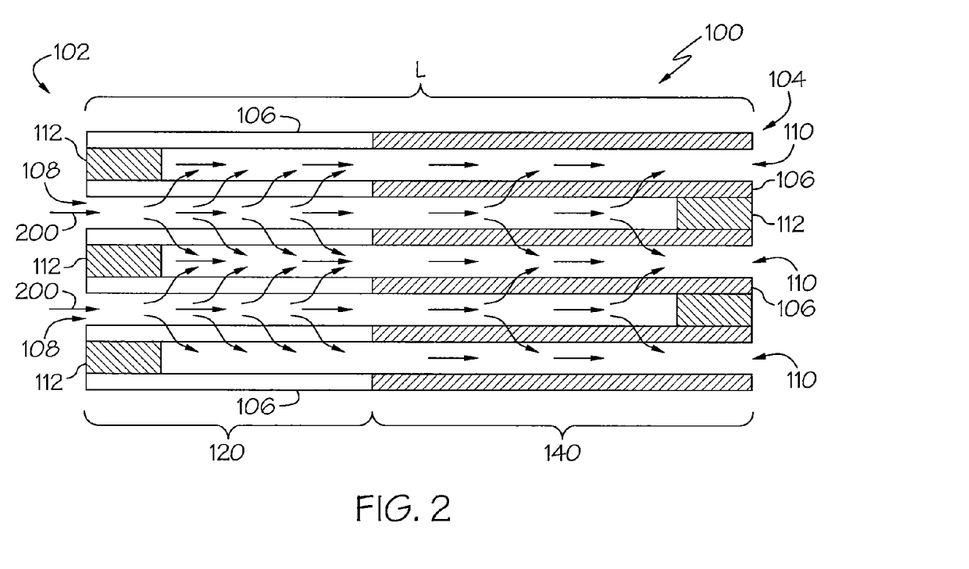
FIG. 2 schematically depicts a partial axial cross section of the particulate filter of FIG. 1, according to one embodiment shown and described herein.
Figure 3:
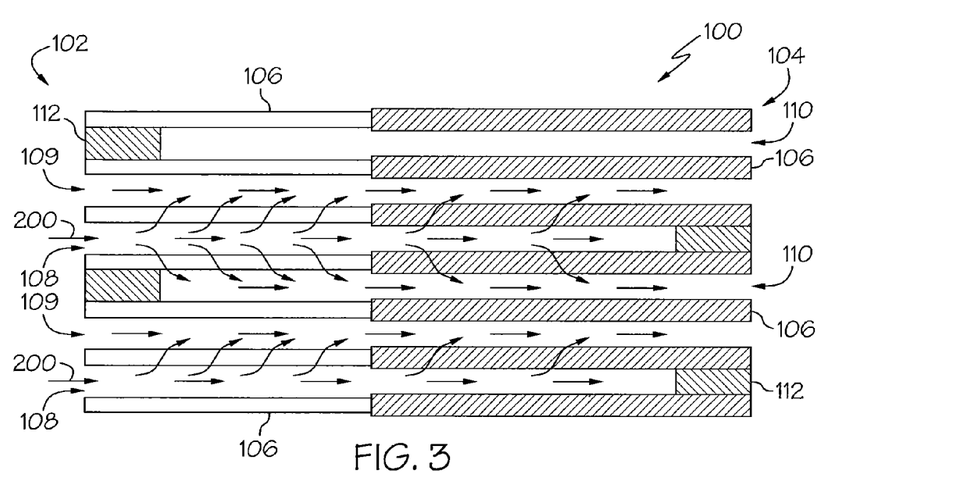
FIG. 3 schematically depicts a partial axial cross section of the particulate filter of FIG. 1, according to another embodiment shown and described herein.

Referring now to FIG. 1 and the axial cross section of the particulate filter shown in FIGS. 2 and 3, the plurality of channels 101 are generally square in cross section. However, in alternative embodiments, the plurality of channels in the article may have other cross-sectional configurations, including rectangular, round, oblong, triangular, octagonal, hexagonal, or combinations thereof For honeycombs utilized in filter applications, certain channels are designated as inlet channels 108 and certain other channels are designated as outlet channels 110. In some embodiments of the particulate filter 100, at least a first set of channels may be plugged with plugs 112. Generally, the plugs 112 are arranged proximate the ends (i.e., the inlet end or the outlet end) of the channels 101. The plugs are generally arranged in a pre-defined pattern, such as in the checkerboard pattern shown in FIG. 1, with every other channel being plugged at an end. The inlet channels 108 may be plugged at or near the outlet end 104, and the outlet channels 110 may be plugged at or near the inlet end 102 on channels not corresponding to the inlet channels, as depicted in FIG. 2. Accordingly, each cell may be plugged at or near one end of the particulate filter only.

While FIG. 1 generally depicts a checkerboard plugging pattern, it should be understood that alternative plugging patterns may be used in the porous ceramic honeycomb article. Further, in some embodiments, a second set of channels may be flow-through channels 109 which are not plugged, as is schematically depicted in FIG. 3. In these embodiments, the particulate filter 100 may be referred to as a scalable filter or a partial filter.

In the embodiments described herein, the particulate filter 100 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 106 of the particulate filter 100 may have a thickness of greater than about 4 mils (101.6 microns). For example, in some embodiments, the thickness of the channel walls 106 may be in a range from about 4 mils up to about 30 mils (762 microns). In some other embodiments, the thickness of the channel walls 106 may be in a range from about 7 mils (177.8 microns) to about 20 mils (508 microns).

In the embodiments of the particulate filter 100 described herein the channel walls 106 of the particulate filter 100 may have a bare open porosity (i.e., the porosity before any coating is applied to the honeycomb body) % P≥35% prior to the application of any coating to the particulate filter 100. In some embodiments the bare open porosity of the channel walls 106 may be such that 40%≤% P≤70%. In other embodiments, the bare open porosity of the channel walls 106 may be such that 50%≤% P≤67%.

Further, the channel walls 106 of the particulate filter 100 are formed such that the pore distribution in the channel walls 106 has a mean pore size of ≤30 microns prior to the application of any coatings (i.e., bare). For example, in some embodiments, the mean pore size may be ≥8 microns and less than or ≤30 microns. In other embodiments, the mean pore size may be ≥10 microns and less than or ≤30 microns. In other embodiments, the mean pore size may be ≥10 microns and less than or ≤25 microns. In general, particulate filters produced with a mean pore size greater than about 30 microns have reduced filtration efficiency while with particulate filters produced with a mean pore size less than about 8 microns may be difficult to infiltrate the pores with a washcoat containing a catalyst. Accordingly, it is generally desirable to maintain the mean pore size of the channel wall between about 8 microns and about 30 microns.

In the embodiments described herein the honeycomb body of the particulate filter 100 is formed from a ceramic material such as, for example, cordierite, silicon carbide, aluminum oxide, aluminum titanate or any other ceramic material suitable for use in elevated temperature particulate filtration applications. For example, the particulate filter 100 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to ceram the plugs and secure the plugs in the channels.

Referring now to FIGS. 2 and 3, the particulate filters described herein are formed such that the particulate filter has both a filter zone 120 for filtering particulate material from an exhaust stream and a DeNO$_x$ zone 140 for reducing NO$_x$ compounds in the exhaust gas stream in a single honeycomb body. The DeNO$_x$ zone 140 is located downstream of the filter zone 120. In one embodiment, the filter zone 120 extends from the inlet end 102 of the particulate filter 100 in an axial direction (as indicated by arrow 121) towards the outlet end 104. In other embodiments (not shown), the filter zone 120 may be offset from the inlet end 102 of the particulate filter 100. For example, in some embodiments, the filter zone 120 may be spaced apart from the inlet end 102 of the particulate filter 100 by a separate zone which comprises a coating disposed on the channel walls 106. In general, the axial length $l_{fz}$ of the filter zone 120 is less than the axial length L of the particulate filter 100. In some embodiments, the axial length $l_{fz}$ of the filter zone 120 may be 50% or less of the axial length L of the particulate filter 100. In other embodiments, the axial length $l_{fz}$ may be 33% of the axial length L of the particulate filter 100. However, it should be understood that the axial length $l_{fz}$ of the filter zone 120 may be any percentage of the axial length L of the particulate filter 100 such that the axial length of the filter zone 120 is less than the axial length L of the particulate filter 100.

In the embodiments of the particulate filter 100 described herein, the filter zone 120 is bare. That is, the channel walls 106 and/or the pores of the channel walls 106 in the filter zone 120 do not contain a coating layer which would decrease the permeability of the channel walls 106 to a fluid flowing through the inlet and/or outlet channels. However, it should be understood that, in other embodiments (not shown), the channel walls 106 and/or the pores of the channel walls 106 in the filter zone 120 may contain a coating layer so long as the coating layer does not decrease the permeability of the channel walls of the filter zone 120 to less than the permeability of the channel walls in the DeNO$_x$ zone 140.

The DeNO$_x$ zone 140 is located downstream of the filter zone 120 and generally extends in an axial direction 121 towards the outlet end 104 of the particulate filter 100. In one embodiment, the DeNO$_x$ zone 140 is directly adjacent to the filter zone 120 such that the DeNO$_x$ zone 140 extends from the end of the filter zone 120 in an axial direction 121 towards the outlet end 104 of the particulate filter 100, as depicted in FIGS. 2 and 3. In other embodiments (not shown), the DeNO$_x$ zone 140 may be spaced apart from the filter zone 120 by one or more intermediate zones positioned between the DeNO$_x$ zone 140 and filter zone 120. However, it should be understood that, regardless of the spacing between the DeNO$_x$ zone 140 and the filter zone 120, the DeNO$_x$ zone 140 is always located downstream of the filter zone 120.

As described above with respect to the filter zone, the DeNO$_x$ zone 140 generally has an axial length $l_{Dz}$ which is less than the axial length L of the particulate filter 100. For example, in some embodiments, the axial length $l_{Dz}$ of the DeNO$_x$ zone 140 may be 50% or more of the axial length $l_{Dz}$ of the DeNO$_x$ zone 140. In other embodiments, the DeNO$_x$ zone 140 may be 67% of the axial length L of the particulate filter. In general, the sum of the axial length $l_{Dz}$ of the DeNO$_x$ zone 140 and the axial length of the filter zone 120 is less than or equal to the axial length L of the particulate filter 100.

In order to enable the reduction of NO$_x$ gas in the particulate filter 100, the channel walls 106 of the particulate filter 100 comprise a DeNO$_x$ functional catalyst in the DeNO$_x$ zone 140. In some embodiments, the DeNO$_x$ functional catalyst is a catalyst suitable for the selective catalytic reduction (SCR) of NO$_x$ in an exhaust gas stream. The SCR catalyst may include, without limitation, oxides of base metals such as vanadium, tungsten, molybdenum, ceria, zirconia, and the like as well as mixtures thereof and/or zeolite-based SCR catalysts such as copper-exchanged or iron-exchanged zeolite. Moreover it should be understood that mixtures of all of the above may be used as the SCR catalyst. Alternatively, the $DeNO_x$ functional catalyst may be a lean $NO_x$ trap. Suitable materials which may be used for a lean $NO_x$ trap in the $DeNO_x$ zone 140 of the particulate filter 100 include oxides of alkaline earth metals, such as barium oxide and the like, alkali metals, and noble metals such as (Pt, Pd, Rh). In yet another alternative, the $DeNO_x$ functional catalyst may comprise a lean $NO_x$ catalyst. Suitable materials which may be used for a lean $NO_x$ catalyst include zeolites, alumina-based catalysts, precious metal catalysts, or base metal catalysts. While the $DeNO_x$ zone has been described herein as having a $DeNO_x$ functionality, it should be understood that the $DeNO_x$ zone may also have a filtration functionality, however, due to the reduced permeability of the $DeNO_x$ zone, the primary filtration activity occurs in the filter zone rather than the $DeNO_x$ zone.

In the embodiments described herein the $DeNO_x$ functional catalyst is washcoated onto the channel walls 106 of the $DeNO_x$ zone 140 such that the $DeNO_x$ functional catalyst is on the channel walls 106 of the $DeNO_x$ zone 140, in the pores of the channel walls 106 of the $DeNO_x$ zone 140 (schematically illustrated in FIG. 2), or both on the channel walls 106 of the $DeNO_x$ zone 140 and in the pores of the channel walls 106 of the $DeNO_x$ zone 140 (schematically illustrated in FIG. 3). The $DeNO_x$ functional catalyst may be deposited in the $DeNO_x$ zone 140 by first forming a slurry of the $DeNO_x$ functional catalyst in a liquid vehicle, such as water. For example, when the $DeNO_x$ functional catalyst is an SCR catalyst, such as a copper exchanged zeolite, the SCR catalyst is mixed with water to form a slurry. The outlet end 104 of the particulate filter 100 is then submerged in the slurry to allow the slurry to infiltrate the particulate filter 100 to a desired depth which, in one embodiment, generally corresponds to the axial length $l_{Dz}$ of the $DeNO_x$ zone. More specifically, the slurry enters the outlet channels 110 and/or flow-through channels 109 of the particulate filter 100 and permeates through the channel walls 106 into adjacent inlet channels 108 via the open pore structure of the channel walls 106 thereby depositing catalyst in the pores of the channel walls 106. In one embodiment, a vacuum system may be attached to the inlet end 102 of the particulate filter 100 when the particulate filter is submerged in the slurry. The vacuum system draws the catalyst upwards and through the channel walls 106. After the particulate filter 100 is removed from the slurry, excess slurry is allowed to drain from the particulate filter 100. In one embodiment, a compressed fluid, such as compressed air, may be injected into the particulate filter 100 to assist in removing the remaining slurry. Thereafter, the particulate filter 100 is dried.

Washcoating the particulate filter 100 with a catalyst coating tends to reduce the size of the pores and the porosity in the channel walls 106 as the catalyst is deposited in the pores when the washcoat is removed and/or dried. As a result, the permeability of the washcoated channel walls 106 decreases. In the embodiments described herein, the $DeNO_x$ zone 140 of the particulate filter 100 is washcoated so as to achieve a desired permeability ratio between the filter zone 120 and the $DeNO_x$ zone 140. In the embodiments described herein, the $DeNO_x$ zone 140 of the particulate filter 100 is washcoated with catalyst such that the ratio of the permeability $\kappa_{fz}$ of the filter zone 120 to the permeability $\kappa_{Dz}$ of the $DeNO_x$ zone 140 is at least 2 (i.e., $\kappa_{fz}:\kappa_{Dz} \geq 2$). In some embodiments, the ratio of the permeability $\kappa_{fz}$ of the filter zone 120 to the permeability $\kappa_{Dz}$ of the $DeNO_x$ zone 140 is $\geq 4$ or even $\geq 5$.

Washcoating the particulate filter to achieve such ratios decreases the permeability of the $DeNO_x$ zone 140 relative to the filter zone 120. As a result, exhaust gas 200 entering the inlet channels 108 is more prone to pass through the channel walls 106 of the particulate filter 100 in the filter zone 120 which removes soot from the exhaust gas prior to the exhaust gas being catalytically reacted with the $DeNO_x$ functional catalyst in the $DeNO_x$ zone. Depositing the soot in the filter zone 120 before reacting the exhaust gas in the $DeNO_x$ zone enriches the soot in the filter zone. Moreover, because the $DeNO_x$ zone 140 is downstream of the filter zone 120, more $NO_2$ is present in the exhaust gas in the filter zone 120 to facilitate passive regeneration of the filter as the $NO_2$ has not yet been catalytically reduced in the $DeNO_x$ zone 140. These relatively higher $NO_2$ concentrations in the filter zone can be exploited to produce a diesel particulate filter with significantly improved passive regeneration performance.

Figure 4:
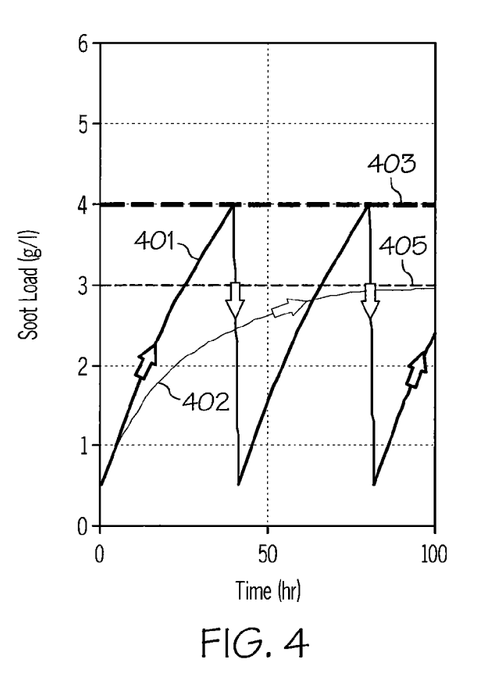
FIG. 4 graphically depicts the soot load as a function of time for both passive and active regeneration.

As particulate matter (i.e., soot) is deposited on the channel walls 106 and in the pores of the channel walls 106 in the filter zone 120, the permeability of the channel walls 106 decreases. The permeability of the particulate filter can be restored by regeneration which entails combusting the deposited soot. Regeneration may occur actively or passively. In active regeneration, the exhaust gas upstream of the filter is increased, for example, by dosing hydrocarbon into the exhaust gas stream and converting the hydrocarbon into heat over an oxidation catalyst upstream of the filter to thereby support combustion of the loaded soot once the soot load reaches a predetermined operation limit on the channel walls of the filter zone 120. Dosing the hydrocarbon increases the temperature of the particulate filter and the soot is combusted thereby rapidly decreasing the soot load and pressure drop of the particulate filter 100. Curve 401 of FIG. 4A graphically depicts the soot load of a particulate filter as a function of time for an active system. Specifically, curve 401 shows that, upon reaching the predetermined operation limit 403, active regeneration rapidly reduces the soot load in the particulate filter thereby restoring the filtration efficiency of the particulate filter.

For a passive system, the soot deposited on the channel walls reacts with $NO_2$ present in the exhaust gas stream causing the soot to combust and yielding NO. Curve 402 of FIG. 4A graphically depicts the soot load of a particulate filter as a function of time for a passive system. As soot accumulates on the channel walls of the particulate filter, the reaction between the soot and $NO_2$ present in the exhaust gas stream balances with the soot loading rate when the soot load reaches a balance point 405 below the predetermined operation limit 403 of the particulate filter.

More specifically, passive regeneration is driven by the reaction of the soot with $NO_2$ in the exhaust gas stream according to the following equations:

$$C+(1-\beta)NO_2+0.5O_2 \rightarrow \beta CO+(1-\beta)CO_2+(1-\beta)NO,$$
where $\alpha$ and $\beta$ are the ratio of reaction products which yield CO in the reaction. Moreover, the passive soot reaction kinetics may be expressed as:

where

$$\frac{ds}{dt}$$

is the reaction rate in g/s, s is the soot load in grams, T is the temperature in K, and $y_{NO_2}$ and $y_{O_2}$ are the respective mole fractions of $NO_2$ and $O_2$, $M_s$ is the molecular weight in g/mol, $a_s$ is the specific surface area of the soot in m²/g, $k_{o,h}$ and $k_{o,l}$ are reaction constants in (mol/s)/m², $E_h$ and $E_l$ are activation energies, in J/mol, and R and b are constants.

Moreover, the reduction of $NO_x$ compounds in an exhaust gas stream generally involves the reaction of $NO_x$ species with a reductant (i.e., CO, $H_2$, HC, or $NH_3$) to yield nitrogen and water. For example, when the $DeNO_x$ functional catalyst is an SCR catalyst, as described above, ammonia ($NH_3$) may be injected into the exhaust gas stream to facilitate the reduction of $NO_x$ compounds in the exhaust gas stream with the catalyst. The SCR $DeNO_x$ reactions proceed according to the following equations:

a)

b)

c)

wherein equation a) is for the standard SCR reaction, equation b) is for the fast SCR reaction, and equation c) is for the $NO_2$ SCR reaction.

Accordingly, the passive regeneration of soot and the reduction of $NO_x$ in the exhaust gas stream both utilize $NO_2$ as a reactant, with the passive regeneration requiring $NO_2$ to actually combust the soot. In some conventional (i.e., non-inventive) particulate filters, the cell walls of the particulate filter may be coated with a $DeNO_x$ functional catalyst along the entire length of the filter body. In the conventional design, the passive regeneration reaction and the SCR catalytic reaction occur at the same time along the entire length of the filter. As such, the two processes compete for the $NO_2$ in the exhaust gas stream which significantly decreases the reaction rate of the passive regeneration process. With the reaction rate of the passive regeneration process decreased, the soot deposition on the channel walls may lead to soot deposition outpacing the passive regeneration reaction, ultimately increasing the frequency at which the particulate filters needs to be actively regenerated and, undesireably, the number of thermal cycles to which the particulate filter is exposed.

However, it has now been determined that particulate filters with separate filter zones and $DeNO_x$ zones, as described herein, have significantly improved passive regeneration performance while, at the same time, having comparable $DeNO_x$ conversion efficiencies and pressure drops as conventional, evenly coated filter designs. Referring again to FIGS. 2 and 3, the improvement in passive regeneration performance is, in part, due to the different permeabilities of the filter zones and the $DeNO_x$ zones. In particular, forming the particulate filter 100 such that the filter zone 120 has a greater permeability than the $DeNO_x$ zone 140 encourages exhaust gas 200 entering the particulate filter in the inlet channels 108 to flow through the channel walls 106 in the filter zone 120 rather than in the downstream $DeNO_x$ zone 140. Accordingly, more soot is deposited in the filter zone 120 than the low permeability $DeNO_x$ zone where the passive regeneration rate may be lower, as described above. Furthermore, depositing the soot in the filter zone 120 enriches the soot in the filter zone.

Moreover, positioning the $DeNO_x$ zone 140 downstream of the filter zone 120 substantially mitigates the competition for $NO_2$ in the exhaust gas 200 between the $NO_x$ reduction reactions and the passive regeneration reactions, thereby increasing the passive regeneration rate of the particulate filter. More specifically, positioning the $DeNO_x$ zone 140 downstream of the filter zone 120 allows the $NO_2$ necessary for the passive regeneration reaction to be utilized to combust the soot in the filter zone before the $NO_2$ in the exhaust gas stream is consumed downstream in the $DeNO_x$ zone. While some reduction of the $NO_x$ conversion efficiency of the $DeNO_x$ zone may result from the upstream consumption of $NO_2$, this reduction is relatively minor and may be compensated for by increased loading of catalyst in the $DeNO_x$ zone.

SIMULATED EXAMPLES

The following examples are intended to demonstrate the effectiveness of particulate filters with separate filter and $DeNO_x$ zones, as described herein. The examples are based on computer simulations of: the wall flow and soot distribution along the axial length of the filter; the pressure drop through the filter as a function of soot loading; the passive regeneration rate; and the $DeNO_x$ conversion efficiency. The simulations were based on 2 inch diameter high porosity cordierite honeycomb particulate filters having an axial length of 6 inches. The filters had a channel density of 200 cpsi and a wall thickness of 16 mils.

A first simulated filter had a filter zone with an axial length $l_{fz}$ which was 33% of the axial length of the particulate filter and a $DeNO_x$ zone with an axial length $l_{Dz}$ which was 67% of the axial length of the particulate filter. The simulated filter was zone-coated with 120 g/l of Fe-zeolite catalyst in the $DeNO_x$ zone. The filter zone was bare.

A second simulated filter had a filter zone with an axial length $l_{fz}$ which was 50% of the axial length of the particulate filter and a $DeNO_x$ zone with an axial length $l_{Dz}$ which was 50% of the axial length of the particulate filter. The simulated filter was zone-coated with 160 g/l of Fe-zeolite catalyst in the $DeNO_x$ zone such that the first simulated filter and the second simulated filter had the same total amount of catalyst loading. The filter zone was bare.

The first and second simulated filters had an estimated decrease in permeability from approximately $5 \times 10^{-12}$ m² to $1 \times 10^{-13}$ m² between the filter zone and the $DeNO_x$ zone or a catalyst loading of 160 g/l. The porosity of the $DeNO_x$ zone also decreased from about 70% to about 10% after catalyst loading.

A comparative simulated filter was evenly coated with 80 g/l of the Fe-zeolite catalyst over the entire length of the filter.

Figure 5A:
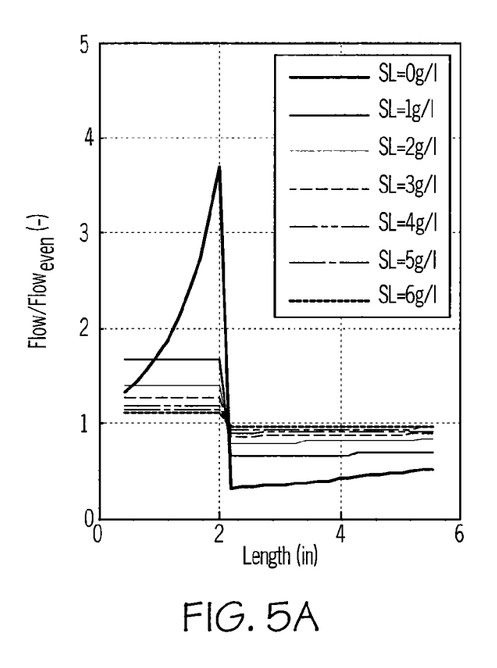
FIGS. 5A and 5B graphically depicts the normalized fluid flow across the wall of the particulate filter along the axial length L of the particulate filter (FIG. 5A) and the soot load on the wall of the particulate filter along the axial length L of the particulate filter (FIG. 5B) for multiple soot loads.
Figure 5B:
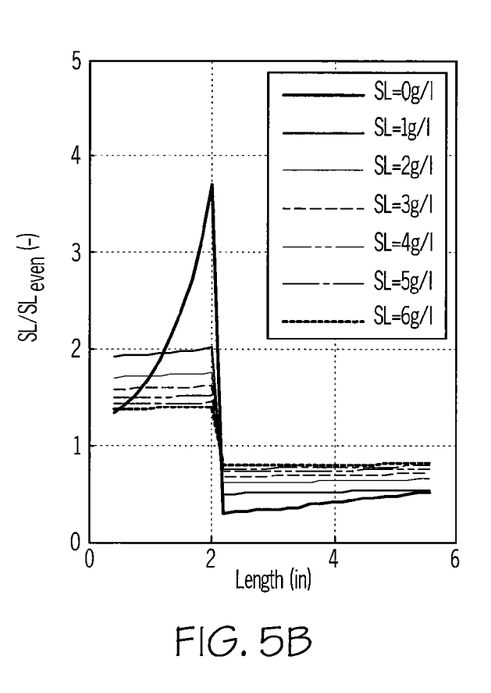

FIGS. 5A and 5B show the simulated flow and soot distribution along the axial length of the first simulated filter. The quantity Flow/Flow$_{even}$ is defined as the ratio of local flow rate to the reference rate, wherein the reference rate is defined as evenly distributed flow. SL/SL$_{even}$ is similarly defined for the soot load distribution along the axial length. Referring to FIG. 5A, the flow and soot distributions are very uneven at lower soot loadings (0~1 g/l) due to the difference in permeability between the filter zone and the $DeNO_x$ zone, thus indicating that the difference in permeability effectively encourages soot deposition in the filter zone rather than the $DeNO_x$ zone, particularly at lower soot loads. However, as more soot accumulates, a less uneven distribution is observed as the permeability of the filter zone approaches the permeability of the $DeNO_x$ zone. In general, soot is significantly enriched in the filter zone by the zone coating in the $DeNO_x$ zone at the rear of the filter. The enrichment is higher with a larger difference in permeability between the filter zone and the DeNO$_x$ zone and lower total soot load in the filter.

Figure 6A:
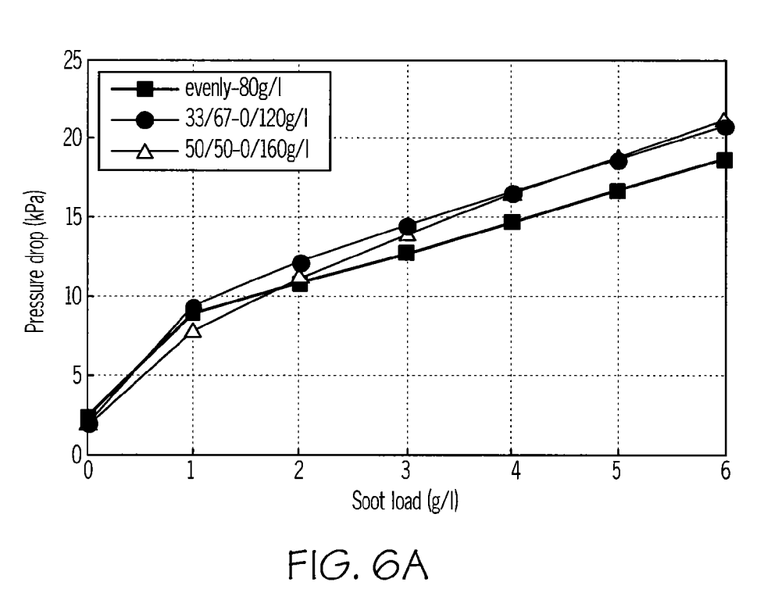
FIGS. 6A and 6B depicts the simulated and measured pressure drop, respectively, for inventive and comparative particulate filters.
Figure 6B:
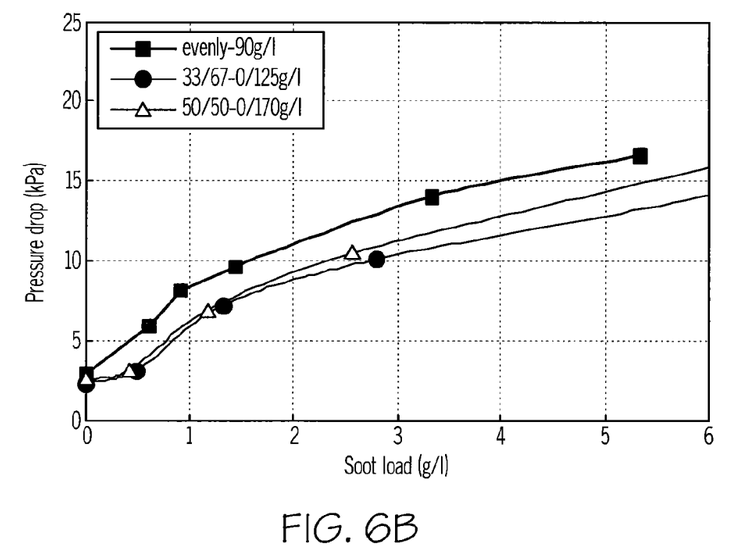

FIG. 6A shows the pressure drop comparison for the first simulated filter, the second simulated filter, and the comparative filter. From the simulation results, the first simulated filter and the second simulated filter show comparable pressure drops to the evenly coated filter. The difference is around 15% at 5 g/l. FIG. 6B shows the results of actual experimental measurements made on similarly coated filters. These results indicate that the zone coated filters have a lower pressure drop than the evenly coated filter, which suggests that a greater amount of flow is diverted from the DeNO$_x$ zone to the filter zone due to the permeability mismatch between the two zones.

Figure 7A:
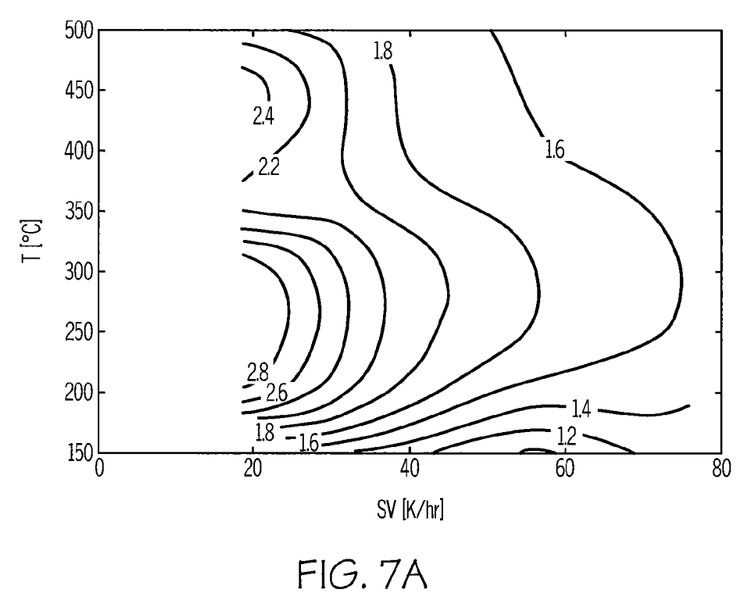
FIGS. 7A and 7B graphically depict the ratio of the passive reaction rate of an inventive particulate filter to the passive reaction rate of a comparative particulate filter as a function of space velocity and temperature for soot loads of 0.5 g/l and 5.0 g/l, respectively.
Figure 7B:
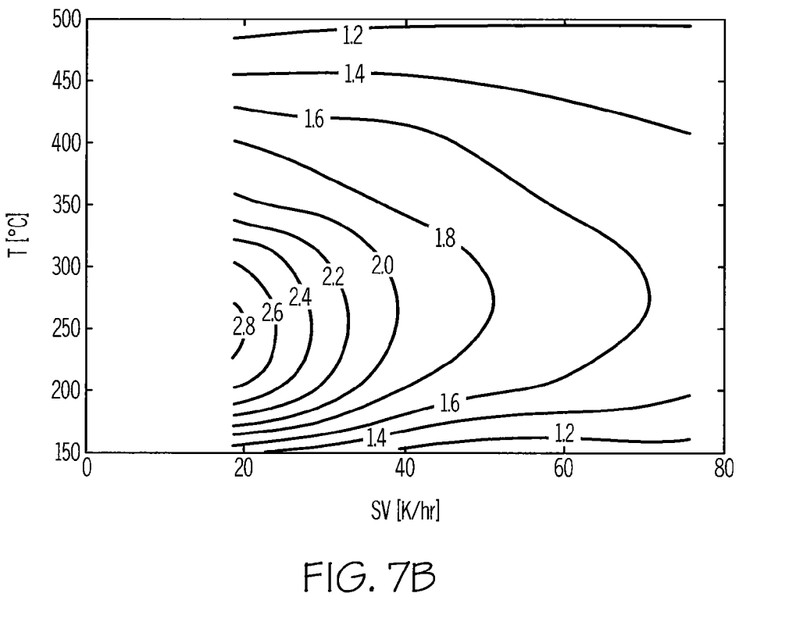

As noted hereinabove, the passive regeneration reaction rate directly correlates to the soot load and the concentration of NO$_2$ in the exhaust gas stream. Compared to an evenly coated filter, the overall filter regeneration rate for a particulate filter with an upstream filter zone and a downstream DeNO$_x$ zone is enhanced by exposure of more soot to relatively higher NO$_2$ concentrations at the inlet of the particulate filter. FIGS. 7A and 7B show the contours of the ratio of passive regeneration rates between the second simulated particulate filter and the comparative filter as a function of the temperature and the exhaust gas space velocity at soot loads of 0.5 g/l (FIG. 7A) and 5 g/l (FIG. 7B). The ratio of the passive regeneration rate is always greater than 1, minimally greater than about 1.2, which means the passive regeneration rate of particulate filters formed as disclosed herein is always greater than an evenly coated filter. The overall trend is that passive regeneration is more enhanced at lower soot load and lower space velocity (SV). At filter operating conditions, such as 20 K/hr space velocity, temperatures of approximately 300° C., and a soot load of 0.5 g/l, the passive regeneration rate of the second simulated filter can be almost triple that of the comparative filter.

Figure 8A:
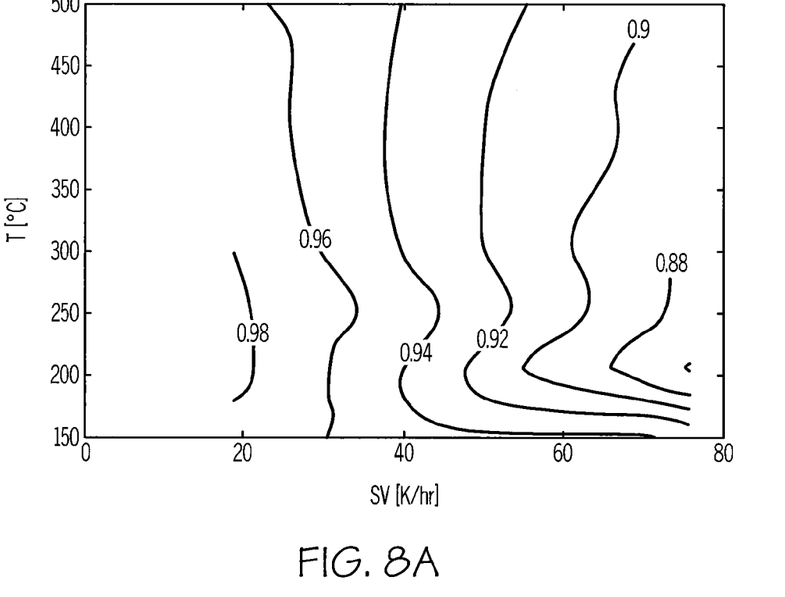
FIGS. 8A and 8B graphically depict the ratio of the DeNO$_x$ conversion efficiency of an inventive particulate filter to the DeNO$_x$ conversion efficiency of a comparative particulate filter as a function of space velocity and temperature for soot loads of 0.5 g/l and 5.0 g/l, respectively.
Figure 8B:
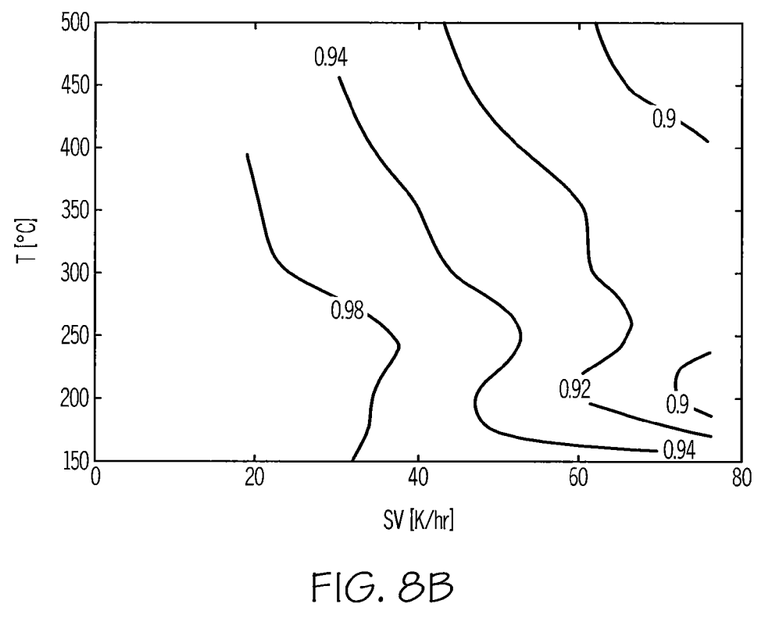

As noted above, the DeNO$_x$ efficiency may be slightly reduced for particulate filters with separate filter and DeNO$_x$ zones due to higher catalyst volume based space velocity. For example, FIGS. 8A and 8B show the ratio of DeNO$_x$ efficiencies between the second simulated filter and the comparative filter for soot loads of 0.5 g/l and 5.0 g/l, respectively. The contour plots indicate the decrease in DeNO$_x$ conversion efficiency is slightly less than one. However, it has been determined that this loss may be compensated for by increasing the amount of catalyst loading in the DeNO$_x$ zone.

While no data regarding ash effects is shown here, ash effects are expected to be minor for the following reasons. Ash deposition is more likely to be distributed at the end of the inlet channels, thus further reducing permeability of the DeNO$_x$ zone of the filter and driving more exhaust flow to the filter zone thereby enriching the soot in the front of the filter. Further, the SCR reaction in the DeNO$_x$ zone is more driven by back diffusion of ammonia and NO$_2$ to the catalyst on the channel walls therefore, even for cases when the rear of the filter is plugged with ash, the SCR reaction will still proceed.

Based on the foregoing, it should now be understood that particulate filters with an upstream filter zone and a downstream DeNO$_x$ zone may be utilized to increase the passive regeneration reaction rate of the particulate filter and thereby reduce the balance point of particulate filtration systems utilizing passive regeneration. When particulate filters as described herein are utilized in particulate filtration systems with active regeneration, the particulate filters as described herein will reduce the frequency of active regeneration thereby reducing the need for hydrocarbon dosing in the exhaust gas stream and improving the fuel consumption of the vehicle. Decreasing the frequency of active regeneration reduces the number of thermal cycles to which the filter is exposed and, as such, may prolong the service life of the particulate filter. In certain situations, particulate filters as described herein may sufficiently lower the balance point of a particulate filtration system utilizing active regeneration such that the particulate filtration system is actually converted to a passive system.

Moreover, because the DeNO$_x$ zone and filter zone of particulate filters described herein are incorporated into a single honeycomb body, the present particulate filters may be utilized to decrease the overall volume of current exhaust gas treatment systems, particularly those systems which incorporate separate particulate filters and DeNO$_x$ catalysts, without a corresponding reduction in passive regeneration performance, as in the case with evenly coated particulate filters.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A particulate filter comprising:
   a honeycomb body comprising an inlet end and an outlet end with a plurality of channel walls extending from the inlet end to the outlet end, the plurality of channel walls defining channels that direct a flow of fluid from the inlet end to the outlet end, wherein at least a first set of the channels are plugged proximate at least one of the inlet end or the outlet end;
   a filter zone extending from the inlet end of the honeycomb body in an axial direction of the honeycomb body, wherein an axial length $l_{fz}$ of the filter zone is less than an axial length L of the honeycomb body; and
   a DeNO$_x$ zone downstream of the filter zone and extending in an axial direction towards the outlet end of the honeycomb body, wherein the plurality of channel walls of the honeycomb body comprise a DeNO$_x$ functional catalyst in the DeNO$_x$ zone and a ratio of a permeability $\kappa_{fz}$ of the channel walls in the filter zone to a permeability $\kappa_{Dz}$ of the channel walls in the DeNO$_x$ zone ($\kappa_{fz}:\kappa_{Dz}$) is at least 5.

2. The particulate filter of claim 1, wherein the DeNO$_x$ functional catalyst is a selective catalytic reduction (SCR) coating, a lean NO$_x$ trap coating, or a lean NO$_x$ catalyst coating.

3. The particulate filter of claim 1, wherein the DeNO$_x$ functional catalyst is an SCR coating comprising zeolite.

4. The particulate filter of claim 1, wherein the DeNO$_x$ functional catalyst is an SCR coating comprising at least a metal oxide.

5. The particulate filter of claim 1, wherein the filter zone has a bare open porosity greater than or equal to 35%.

6. The particulate filter of claim 1, wherein the channel walls of the honeycomb body have a mean pore size of less than or equal to 30 microns.

7. The particulate filter of claim 1, wherein the honeycomb body has a channel density from about 100 cpsi to about 600 cpsi.

8. The particulate filter of claim 1, wherein the channel walls have a thickness in a range from about 4 mils to about 30 mils.

9. The particulate filter of claim 1, wherein at least a second set of the channels are flow-through channels such that the particulate filter is a scalable filter.

10. The particulate filter of claim 1, wherein the channel walls of the honeycomb body are bare in the filter zone.

11. The particulate filter of claim 1, wherein the $DeNO_x$ functional catalyst is coated in pores of the channel walls in the $DeNO_x$ zone of the honeycomb body.

12. The particulate filter of claim 1, wherein the $DeNO_x$ functional catalyst is distributed on the channel walls and in pores of the channel walls in the $DeNO_x$ zone of the honeycomb body.

13. The particulate filter of claim 1, wherein the axial length $l_{fz}$ of the filter zone is less than 50% of the axial length L of the honeycomb body.

14. The particulate filter of claim 1, wherein a sum of the axial length $l_{fz}$ of the filter zone and an axial length $l_{Dz}$ is less than or equal to the axial length L of the honeycomb body.

15. The particulate filter of claim 1, wherein the particulate filter has a soot regeneration rate which is at least 1.2 times greater than a regeneration rate of a comparative particulate filter having a similar geometry, porosity and median pore size and evenly coated with an equal amount of $DeNO_x$ functional catalyst between the inlet end of the comparative particulate filter and the outlet end of the comparative particulate filter.

16. A particulate filter comprising:
a honeycomb body comprising an inlet end and an outlet end with a plurality of channel walls extending from the inlet end to the outlet end, the plurality of channel walls defining channels that direct a flow of fluid from the inlet end to the outlet end, wherein individual ones of the channels are plugged proximate at least one of the inlet end or the outlet end;
a filter zone extending from the inlet end of the honeycomb body in an axial direction of the honeycomb body, the filter zone filtering particulate matter from the flow of fluid, wherein the channel walls of the channels are bare in the filter zone and an axial length $l_{fz}$ of the filter zone is less than an axial length L of the honeycomb body; and
a $DeNO_x$ zone extending from an end of the filter zone to the outlet end of the honeycomb body in an axial direction of the honeycomb body, wherein the channel walls of the honeycomb body comprise an SCR coating in the $DeNO_x$ zone, the SCR coating reducing $NO_x$ in the flow of fluid, and wherein a ratio of a permeability $\kappa_{fz}$ of the channel walls in the filter zone to a permeability $\kappa_{Dz}$ of the channel walls in the $DeNO_x$ zone ($\kappa_{fz}:\kappa_{Dz}$) is at least 5.

17. The particulate filter of claim 16, wherein:
the filter zone has a bare open porosity greater than or equal to 35%; and
the channel walls of the honeycomb body have a mean pore size less than or equal to about 30 microns.

18. A method of forming a particulate filter, the method comprising: mixing a batch of ceramic precursor materials; extruding the batch of ceramic precursor materials to form a green honeycomb body comprising an inlet end and an outlet end with a plurality of channel walls extending from the inlet end to the outlet end; wherein at least a first set of the channels are plugged proximate at least one of the inlet end or the outlet end; a filter zone extending from the inlet end of the honeycomb body in an axial direction of the honeycomb body, wherein an axial length $L_{fz}$ of the filter zone is less than an axial length L of the honeycomb body; firing the green honeycomb body to form a fired honeycomb body;

and loading a portion of the fired honeycomb body with a DeNOx functional catalyst such that, after loading, the fired honeycomb body has a filter zone and a DeNOx zone comprising the DeNOx functional catalyst downstream of the filter zone and a ratio of a permeability $\kappa_{fz}$ of the channel walls in the filter zone to a permeability $\kappa_{Dz}$ of the channel walls in the DeNOx zone ($\kappa_{fz}:\kappa_{Dz}$) is at least 5.

* * * * *